(12) United States Patent
Fansler et al.

(10) Patent No.: US 7,294,742 B2
(45) Date of Patent: Nov. 13, 2007

(54) RING-OPENED AZLACTONE INITIATORS FOR ATOM TRANSFER RADICAL POLYMERIZATION

(75) Inventors: Duane D. Fansler, Dresser, WI (US); Kevin M. Lewandowski, Inver Grove Heights, MN (US); Babu N. Gaddam, Woodbury, MN (US); Steven M. Heilmann, Afton, MN (US); Larry R. Krepski, White Bear Lake, MN (US); Stephen B. Roscoe, Saint Paul, MN (US); Michael S. Wendland, North Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 245 days.

(21) Appl. No.: 11/081,218

(22) Filed: Mar. 16, 2005

(65) Prior Publication Data

US 2005/0159569 A1   Jul. 21, 2005

Related U.S. Application Data

(62) Division of application No. 10/316,334, filed on Dec. 11, 2002, now Pat. No. 6,992,217.

(51) Int. Cl.
*C07C 229/20* (2006.01)
*C07F 4/00* (2006.01)

(52) U.S. Cl. .................. 562/567; 562/574; 560/70; 526/146; 526/147; 526/135; 526/204; 526/220; 526/307.1; 526/317.1; 526/318; 526/319; 526/44

(58) Field of Classification Search ............. 526/204, 526/220, 307.1, 44, 317.1, 318, 319, 146, 526/147, 135, 317; 525/308, 314; 562/567, 562/574; 560/70; 556/31, 110, 136, 138
See application file for complete search history.

(56) References Cited

U.S. PATENT DOCUMENTS

| | | | |
|---|---|---|---|
| 4,304,705 A | 12/1981 | Heilmann et al. | |
| 5,097,007 A | 3/1992 | Himori | |
| 5,314,962 A | 5/1994 | Otsu et al. | |
| 5,356,947 A | 10/1994 | Ali et al. | |
| 6,677,413 B1 | 1/2004 | Lewandowski et al. | |
| 6,680,362 B1 | 1/2004 | Fansler et al. | |
| 6,747,104 B1 | 6/2004 | Wendland et al. | |
| 6,753,391 B1 * | 6/2004 | Lewandowski et al. | 526/146 |
| 6,762,257 B1 | 7/2004 | Lewandowski et al. | |
| 6,784,264 B2 | 8/2004 | Lewandowski et al. | |
| 6,784,265 B2 | 8/2004 | Fansler et al. | |
| 6,818,716 B2 | 11/2004 | Wendland et al. | |
| 6,841,637 B2 | 1/2005 | Lewandowski et al. | |
| 6,894,133 B2 | 5/2005 | Lewandowski et al. | |
| 6,908,952 B2 | 6/2005 | Lewandowski et al. | |
| 6,911,510 B2 | 6/2005 | Lewandowski et al. | |
| 2004/0116633 A1 | 6/2004 | Fansler et al. | |
| 2004/0152852 A1 | 8/2004 | Lewandowski et al. | |
| 2004/0152853 A1 | 8/2004 | Fansler et al. | |
| 2004/0198933 A1 | 10/2004 | Wendland et al. | |
| 2004/0225090 A1 | 11/2004 | Lewandowski et al. | |
| 2004/0225091 A1 | 11/2004 | Lewandowski et al. | |
| 2005/0065300 A1 | 3/2005 | Lewandowski et al. | |

FOREIGN PATENT DOCUMENTS

| | | |
|---|---|---|
| WO | WO 2004/052943 A1 | 6/2004 |
| WO | WO 2004/052944 A1 | 6/2004 |
| WO | WO 2004/072127 A1 | 8/2004 |
| WO | WO 2004/072139 A1 | 8/2004 |
| WO | WO 2004/094484 A1 | 11/2004 |
| WO | WO 2004/094485 A1 | 11/2004 |
| WO | WO 2004/099275 A1 | 11/2004 |
| WO | WO 2004/099276 A1 | 11/2004 |

OTHER PUBLICATIONS

Lawson et al, J. Am. Chem. Soc., vol. 84, pp. 2017-2018, 1962.*
U.S. Appl. No. 11/081,197, filed Mar. 16, 2005 entitled "Ring-Opened Azlactone Photoiniferters For Radical Polymerization".

* cited by examiner

*Primary Examiner*—Shailendra Kumar
(74) *Attorney, Agent, or Firm*—Kent S. Kokko

(57) ABSTRACT

Initiators for atom transfer radical polymerizations are described. The initiators have an azlactone or ring-opened azlactone moiety to provide telechelic (co)polymers.

23 Claims, No Drawings

RING-OPENED AZLACTONE INITIATORS FOR ATOM TRANSFER RADICAL POLYMERIZATION

This application is a divisional of U.S. Ser. No. 10/316,334, filed Dec. 11, 2002, now U.S. Pat. No. 6,999,217, the disclosure of which is herein incorporated by reference.

FIELD OF THE INVENTION

The present invention provides initiators and initiator systems for atom transfer radical polymerization (ATRP) processes.

BACKGROUND

In conventional radical polymerization processes, the polymerization terminates when reactive intermediates are destroyed or rendered inactive; radical generation is essentially irreversible. It is difficult to control the molecular weight and the polydispersity (molecular weight distribution) of polymers produced by conventional radical polymerization, and difficult to achieve a highly uniform and well-defined product. It is also often difficult to control radical polymerization processes with the degree of certainty necessary in specialized applications, such as in the preparation of end functional polymers, block copolymers, star (co)polymers, and other novel topologies.

In a controlled radical polymerization process radicals are generated reversibly, and irreversible chain transfer and chain termination are absent. There are four major controlled radical polymerization methodologies: atom transfer radical polymerization (ATRP), reversible addition-fragmentation chain transfer (RAFT), nitroxide-mediated polymerization (NMP) and iniferters, each method having advantages and disadvantages.

Atom transfer radical polymerization (ATRP) has been described as a simple, versatile and efficient controlled radical polymerization process. See M. Freemantle, "In Control of a Living Process", Chemical and Engineering News, Sep. 9, 2002, pp. 36-40. ATRP processes typically employ an alkyl halide as an initiator and a transition metal complex as a catalyst to produce a polymeric radical in the presence of a monomer.

Atom transfer radical polymerization systems based on the combination of a transition metal halide and an alkyl halide have been described. "Atom transfer" refers to the transfer of the halogen atom between the transition metal and the polymer chain. For example, K. Matyjaszewski, (*Macromolecules*, vol. 28, 1995, pp. 7901-7910 and WO 96/30421) describes the use of CuX (where X=Cl, Br) in conjunction with bipyridine and an alkyl halide to give polymers of narrow molecular weight distribution and controlled molecular weight. A comprehensive review of ATRP is provided by Matyjaszewski and Xia, *Chem. Rev.*, vol. 101, pp. 2921-2990, 2001.

Thus, there is a need for a radical polymerization process which provides (co)polymers having a predictable molecular weight and a narrow molecular weight distribution (low "polydispersity"). A further need is strongly felt for a radical polymerization process which is sufficiently flexible to provide a wide variety of products, but which can be controlled to the degree necessary to provide highly uniform products with a controlled structure (i.e., controllable topology, composition, stereoregularity, etc.). There is further need for a controlled radical polymerization process which provides telechelic (co)polymers capable of entering into further polymerization or functionalization through reactive end-groups, particularly electrophilic end groups.

SUMMARY OF THE INVENTION

The present invention provides initiators for atom transfer radical polymerization processes that comprise compounds of the formula:

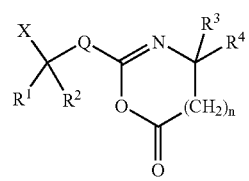

wherein X is Cl, Br, or a pseudohalogen group;

$R^1$ and $R^2$ are each independently selected from X, H, an alkyl group, a cycloalkyl group, a heterocyclic group, an arenyl group and an aryl group, or $R^1$ and $R^2$ taken together with the carbon to which they are attached form a carbocyclic ring;

$R^3$ and $R^4$ are each independently selected from an alkyl group, a cycloalkyl group, an aryl group, an arenyl group, or $R^3$ and $R^4$ taken together with the carbon to which they are attached form a carbocyclic ring;

Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is H, an alkyl group, a cycloalkyl group or an aryl group; and n is 0 or 1.

The present invention also provides initiators that comprise the ring-opened reaction product of the initiators of Formula I and a reactive compound, such as an aliphatic compound, having one or more nucleophilic groups. Such initiators have the general formula:

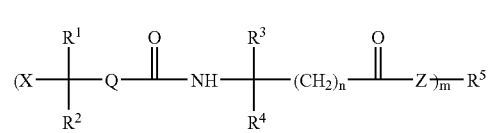

wherein

X is Cl, Br, or a pseudohalogen group;

$R^1$ and $R^2$ are each independently selected from X, H, an alkyl group, a cycloalkyl group, an arenyl group, a heterocyclic group and an aryl group or $R^1$ and $R^2$ taken together with the carbon to which they are attached form a carbocyclic ring;

$R^3$ and $R^4$ are each independently selected from an alkyl group, a cycloalkyl group, an aryl, an arenyl group, or $R^3$ and $R^4$ taken together with the carbon to which they are attached form a carbocyclic ring;

n is 0 or 1;

Z is O, S or $NR^6$, wherein $R^6$ is H, an alkyl group, a cycloalkyl group, an arenyl group, a heterocyclic group or an aryl group;

$R^5$ is an organic or inorganic moiety and has a valency of m, $R^5$ is the residue of a mono- or polyfunctional compound of the formula $R^5(ZH)_m$;

Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is H, an alkyl group, a cycloalkyl group, an arenyl group, a heterocyclic group or an aryl group;

m is an integer of at least 1, preferably at least 2.

In another aspect, the present invention provides an initiator system for controlled radical polymerization comprising the above-described initiators and a transition metal compound that participates in a reversible redox cycle.

The initiators, and initiator systems of the present invention provide (co)polymers having a predictable molecular weight and a narrow molecular weight distribution. Advantageously, the initiators provide novel multireactive addition polymers having first and second terminal reactive groups that may be used for further functionalization. The present invention further provides a controlled radical polymerization process useful in the preparation of terminal-functionalized (telechelic) (co)polymers, block copolymers, star (co)polymers, graft copolymers, and comb copolymers. The process provides these (co)polymers with controlled topologies and compositions.

The control over molecular weight and functionality obtained in this invention allows one to synthesize numerous materials with many novel topologies for applications in coatings, surface modifications, elastomers, sealants, lubricants, pigments, personal care compositions, composites, inks, adhesives, water treatment materials, hydrogels, imaging materials, telechelic materials and the like.

In another aspect, the invention provides a method for polymerization of one or more olefinically unsaturated monomers comprising addition polymerizing one or more olefinically unsaturated monomers using the initiator system comprising the azlactone initiators, or the ring-opened azlactone initiator and a transition metal compound that participates in a reversible redox cycle.

It is to be understood that the recitation of numerical ranges by endpoints includes all numbers and fractions subsumed within that range (e.g. 1 to 5 includes 1, 1.5, 2, 2.75, 3, 3.80, 4, and 5).

It is to be understood that all numbers and fractions thereof are presumed to be modified by the term "about."

It is to be understood that "a" as used herein includes both the singular and plural.

The general definitions used herein have the following meanings within the scope of the present invention.

The term "alkyl" refers to straight or branched, cyclic or acyclic hydrocarbon radicals, such as methyl, ethyl, propyl, butyl, octyl, isopropyl, tert-butyl, sec-pentyl, cyclohexyl, and the like. Alkyl groups include, for example, 1 to 18 carbon atoms, preferably 1 to 12 carbon atoms, or most preferably 1 to 6 carbon atoms.

The term "aryl" means the monovalent residue remaining after removal of one hydrogen atom from an aromatic compound which can consist of one ring or two fused or catenated rings having 6 to 12 carbon atoms.

The term "arenyl" means the monovalent residue remaining after removal of a hydrogen atom from the alkyl portion of a hydrocarbon containing both alkyl and aryl groups having 6 to 26 atoms.

The term "azlactone" means 2-oxazolin-5-one groups and 2-oxazolin-6-one groups of Formula I, where n is 0 and 1, respectively.

The term "heterocyclic group" or "heterocycle" means the monovalent residue remaining after removal of one hydrogen atom from an cycloaliphatic or aromatic compound having one ring or two fused rings having 5 to 12 ring atoms and 1 to 3 heteroatoms selected from S, N, and nonperoxidic O. Useful heterocycles include azlactone, pyrrole, furan, thiophene, imidazole, pyrazole, thiazole, oxazole, pyridine, piperazine, piperidine, hydrogenated and partially hydrogenated derivatives thereof The term "multifunctional" means the presence of more than one of the same functional reactive group;

The term "multireactive" means the presence of two or more of two different functional reactive groups;

The term "polyfunctional" is inclusive of multireactive and multifunctional.

The term "acid catalyst" or "acid catalyzed" means catalysis by a Brønsted- or Lewis-acid species;

The term "molecular weight" means number average molecular weight ($M_n$), unless otherwise specified.

The term "pseudohalogen" refers to polyatomic anions that resemble halide ions in both their acid-base and redox chemistry and have relatively low basicity generally, and form a free radical under ATRP conditions. Useful psuedohalogens include, for example, cyanide, cyanate, thiocyanate, thiosulfate, sulfonyl halides and azide ions.

The term (co)polymer refers to homo- and copolymers.

The term (meth)acrylate refers to both methacrylate and acrylate.

DETAILED DESCRIPTION

The present invention provides novel initiators of Formula I and the corresponding ring-opened initiators of Formula II for controlled radical polymerization processes.

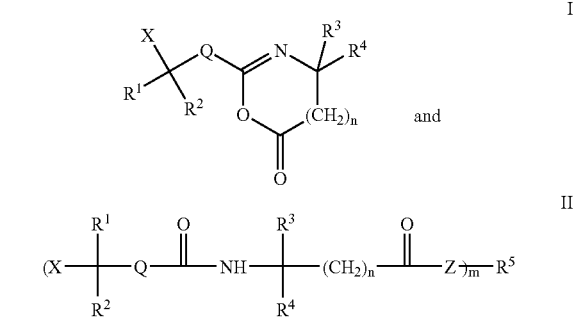

wherein

X is Cl, Br, or a pseudohalogen group, $R^1$ and $R^2$ are each independently selected from X, H, an alkyl group of 1 to 18 carbon atoms, a cycloalkyl group having 3 to 14 carbon atoms, an aryl group having 6 to 12 ring atoms, an arenyl group having 6 to 26 carbon atoms, a heterocyclic group having one ring or two fused rings having 5 to 12 ring atoms and 1 to 3 heteroatoms selected from S, N, and nonperoxidic O; or $R^1$ and $R^2$ taken together with the carbon to which they are attached form a carbocyclic ring containing 4 to 12 ring atoms.

$R^3$ and $R^4$ are each independently selected from an alkyl group having 1 to 18 carbon atoms, a cycloalkyl group having 3 to 14 carbon atoms, an aryl group having 5 to 12 ring atoms, an arenyl group having 6 to 26 carbon atoms and 0 to 3 S, N, and nonperoxidic O heteroatoms, or $R^3$ and $R^4$ taken together with the carbon to which they are attached form a carbocyclic ring containing 4 to 12 ring atoms;

Z is O, NH, S or $NR^6$, wherein $R^6$ is a H, an alkyl group, an aryl group and arenyl group or a heterocyclic group;

$R^5$ is an organic or inorganic moiety and has a valency of m;

m is an integer of at least 1, preferably 1 to 8, most preferably at least 2;

Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is is H, an alkyl group, a cycloalkyl group or an aryl group;

and n is 0 or 1.

The present invention also provides initiator systems for controlled radical polymerization comprising the initiators of Formulas I and/or II and a transition metal compound that participates in a reversible redox cycle, e.g. $Cu^I \Leftrightarrow Cu^{II}$. Useful transition metal compounds have the general formula $[ML_p]^{n+}A^-$, wherein M is a transition metal, generally in a low valency state, L is a ligand, A– is an anion, n is the formal charge on the transition metal having a whole number value of 1 to 7, preferably 1 to 3, and p is the number of ligands on the transition metal having an number value of 1 to 9, preferably 1 to 2.

Useful transition metals, $M^{n+}$, include the low valent states of Cu, Fe, Ru, Cr, Mo, Pd, Ni, Pt, Mn, Rh, Re, Co, V, Zn, Au, Nb and Ag. Preferred low valent metals include Cu(I), Fe(II), Co(II), Ru(II) and Ni(II). Other valent states of these same metals may be used, and the active low valent state generated in situ.

Useful anions, $A^-$, include halogen, $C_1$-$C_6$-alkoxy, $NO_3^{2-}$, $SO_4^{2-}$, $PO_4^{3-}$, $HPO_4^{2-}$, $PF_6^-$, triflate, hexafluorophosphate, methanesulfonate, arylsulfonate, $CN^-$ and alkyl carboxylates and aryl carboxylates.

The ligand, L, is used to solubilize the transition metal salts in a suitable solvent and adjust the redox potential of the transition metal for appropriate reactivity and selectivity. The ligands can direct the metal complex to undergo the desired one-electron atom transfer process, rather than a two-electron process such as oxidative addition/reductive elimination. The ligands may further enhance the stability of the complexes in the presence of different monomers, solvents or at different temperatures. Acidic monomers and monomers that strongly complex transition metals may still be efficiently polymerized by appropriate selection of ligands.

Useful ligands include those having one or more nitrogen, oxygen, phosphorus and/or sulfur atoms which can coordinate to the transition metal through a σ-bond, ligands containing two or more carbon atoms which can coordinate to the transition metal through a π-bond, and ligands which can coordinate to the transition metal through a μ-bond or an η-bond.

Useful ligands include those having one or more nitrogen, oxygen, phosphorus and/or sulfur atoms which can coordinate to the transition metal through a σ-bond are provided by monodentate and polydentate compounds preferably containing up to about 30 carbon atoms and up to 10 hetero atoms selected from aluminum, boron, nitrogen, sulfur, non-peroxidic oxygen, phosphorus, arsenic, selenium, antimony, and tellurium, where upon addition to the metal atom, following loss of zero, one, or two hydrogens, the polydentate compounds preferably forming with the metal, $M^{n+}$, a 4-, 5-, or 6-membered saturated or unsaturated ring. Examples of suitable monodentate compounds or groups are carbon monoxide, alcohols such as ethanol, butanol, and phenol; pyridine, nitrosonium (i.e., $NO^+$); compounds of Group Vb elements such as ammonia, phosphine, trimethylamine, trimethylphosphine, tributylphosphine, triphenylamine, triphenylphosphine, triphenylarsine, tributylphosphite; nitriles such as acetonitrile, benzonitrile; isonitriles such as phenylisonitrile, butylisonitrile; carbene groups such as ethoxymethylcarbene, dithiomethoxycarbene; alkylidenes such as methylidene and ethylidene.

Suitable polydentate compounds or groups include dipyridyl, 1,2-bis(diphenylphosphino)ethane, 1,2-bis(diphenylarsino)ethane, bis(diphenylphosphino)methane, polyamines such as ethylenediamine, propylenediamine, tetramethyl ethylene diamine, hexamethyl tris-aminoethylamine, diethylenetriamine, 1,3-diisocyanopropane, and hydridotripyrazolylborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; 1,10-phenanthroline, porphyrin, cryptands and crown ethers, such as 18-crown-6 and glyoximes such as dimethylglyoxime.

Other suitable ligands that can coordinate to the transition metal through a σ-bond are the inorganic groups such as, for example, $F^-$, $OH^-$, $Cl^-$, $Br^-$, $I^-$, and $H^-$ and groups such as, for example, $CN^-$, $SCN^-$, acetoxy, formyloxy, benzoyloxy, and the like. The ligand can also be a unit of a polymer; for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

Useful ligands containing two or more carbon atoms which can coordinate to the transition metal through a π-bond are provided by any monomeric or polymeric compound having an accessible unsaturated group, i.e., an ethylenic, $-C=C-$ group; acetylenic, $-C\equiv C-$ group; or aromatic group which has accessible π-electrons regardless of the total molecular weight of the compound.

Illustrative of π-bond ligands are the linear and cyclic ethylenic and acetylenic compounds having less than 100 carbon atoms (when monomeric), preferably having less than 60 carbon atoms, and from zero to 10 hetero atoms selected from nitrogen, sulfur, non-peroxidic oxygen, phosphorous, arsenic, selenium, boron, aluminum, antimony, tellurium, silicon, germanium, and tin, the ligands being those such as ethylene, acetylene, propylene, methylacetylene, α-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $\eta^3$-allyl, $\eta^3$-pentenyl, norbornadiene, $\eta^5$-cyclohexadienyl, cycloheptatriene, cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, aluminum, antimony, tellurium, silicon, germanium, and tin, such as, for example, $\eta^5$-cyclopentadienyl, benzene, mesitylene, toluene, xylene, tetramethylbenzene, hexamethylbenzene, fluorene, naphthalene, anthracene, chrysene, pyrene, $\eta^7$-cycloheptatrienyl, triphenylmethane, paracyclophane, 1,4-diphenylbutane, $\eta^5$-pyrrole, $\eta^5$-thiophene, $\eta^5$-furan, pyridine, gamma-picoline, quinaldine, benzopyrane, thiochrome, benzoxazine, indole, acridine, carbazole, triphenylene, silabenzene, arsabenzene, stibabenzene, 2,4,6-triphenylphosphabenzene, $\eta^5$-selenophene, dibenzostannepine, $\eta^5$-tellurophene, phenothiazine, selenanthrene, phenoxaphosphine, phenarsazine, phenatellurazine, $\eta^5$-methylcyclopentadienyl, $\eta^5$-pentamethylcyclopentadienyl, and 1-phenylborabenzene. Other suitable aromatic compounds can be found by consulting any of many chemical handbooks.

Preferred ligands include unsubstituted and substituted pyridines and bipyridines, tertiary amines, including polydentate amines such as tetramethyl ethylenediamine and hexamethyl tris-aminoethylamine, acetonitrile, phosphites such as $(CH_3O)_3P$, 1,10-phenanthroline, porphyrin, cryptands and crown ethers, such as 18-crown-6. The most preferred ligands are polydentate amines, bipyridine and phosphites. Useful ligands and ligand-metal complexes useful in the initiator systems of the present invention are described in Matyjaszewski and Xia, *Chem. Rev.*, vol. 101, pp. 2921-2990, 2001.

Examples of olefinically unsaturated monomers that may be polymerized include (meth)acrylates such as ethyl (meth)acrylate, propyl (meth)acrylate, butyl (meth)acrylate, isooctyl (meth)acrylate and other alkyl (meth)acrylates; also functionalized (meth)acrylates including glycidyl (meth)acrylate, trimethoxysilyl propyl (meth)acrylate, allyl (meth)acrylate, hydroxyethyl (meth)acrylate, hydroxypropyl (meth)acrylate, dialkylaminoalkyl (meth)acrylates; fluoroalkyl (meth)acrylates; (meth)acrylic acid, fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides; butadienes; unsaturated alkylsulphonic acids or derivatives thereof; 2-vinyl-4,4-dimethylazlactone, and (meth)acrylamide or derivatives thereof. Mixtures of such monomers may be used.

Initiators of Formula I may be prepared using the generalized sequence as shown:

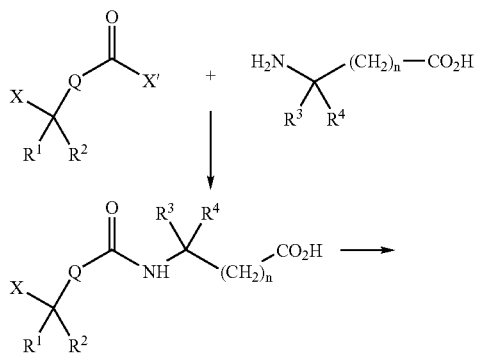

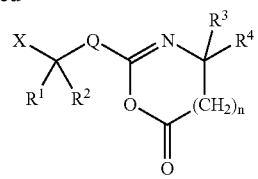

In the above scheme, an amino acid is first acylated, generally by dissolving the amino acid in aqueous base, followed by treatment with the acyl halide compound under interfacial reaction conditions. Cyclization may be effected by treatment with acetic anhydride and pyridine, by treatment with carbodiimides, or preferably by treatment with ethyl chloroformate and a trialkylamine, which proceeds through a mixed carboxylic-carbonic anhydride. Further details regarding the preparation of azlactones may be found in "Polyazlactones", *Encyclopedia of Polymer Science and Engineering*, vol. 11, $2^{nd}$ Ed., John Wiley and Sons, pp. 558-571 (1988). With respect to the above reaction scheme, it will be apparent that diacyl halide starting materials may be used to produce dimeric or bis-azlactone initiators, some examples of which are shown below. These bis-azlactone initiators have the general structure:

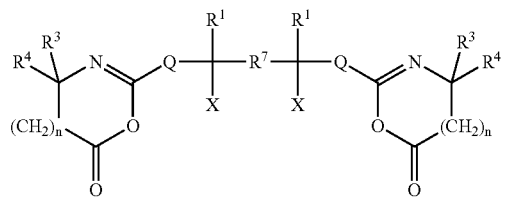

wherein

X is Cl, Br, or a pseudohalogen group, $R^1$ is selected from X, H, an alkyl group of 1 to 18 carbon atoms, a cycloalkyl group having 3 to 14 carbon atoms, an aryl group having 6 to 12 ring atoms, an arenyl group having 6 to 26 carbon atoms, a heterocyclic group having one ring or two fused rings having 5 to 12 ring atoms and 1 to 3 heteroatoms selected from S, N, and nonperoxidic O;

$R^3$ and $R^4$ are each independently selected from an alkyl group having 1 to 18 carbon atoms, a cycloalkyl group having 3 to 14 carbon atoms, an aryl group having 5 to 12 ring atoms, an arenyl group having 6 to 26 carbon atoms and 0 to 3 S, N, and nonperoxidic O heteroatoms, or $R^3$ and $R^4$ taken together with the carbon to which they are attached form a carbocyclic ring containing 4 to 12 ring atoms;

$R^7$ is a divalent alkylene group of 1 to 18 carbon atoms, a cycloalkylene group having 3 to 14 carbon atoms, an aryl group having 6 to 12 ring atoms, or an arenyl group having 6 to 26 carbon atoms, Q is a linking group selected from a covalent bond, $(-CH_2-)_o$, $-CO-O-(CH_2)_o-$, $-CO-O-(CH_2CH_2O)_o-$, $-CO-NR^6-(CH_2)_o-$, $-CO-S-(CH_2)_o-$, where o is 1 to 12, and $R^6$ is is H, an alkyl group, a cycloalkyl group, an arenyl group, a heterocyclic group or an aryl group;

and n is 0 or 1.

Useful azlactone initiators include the following compounds:

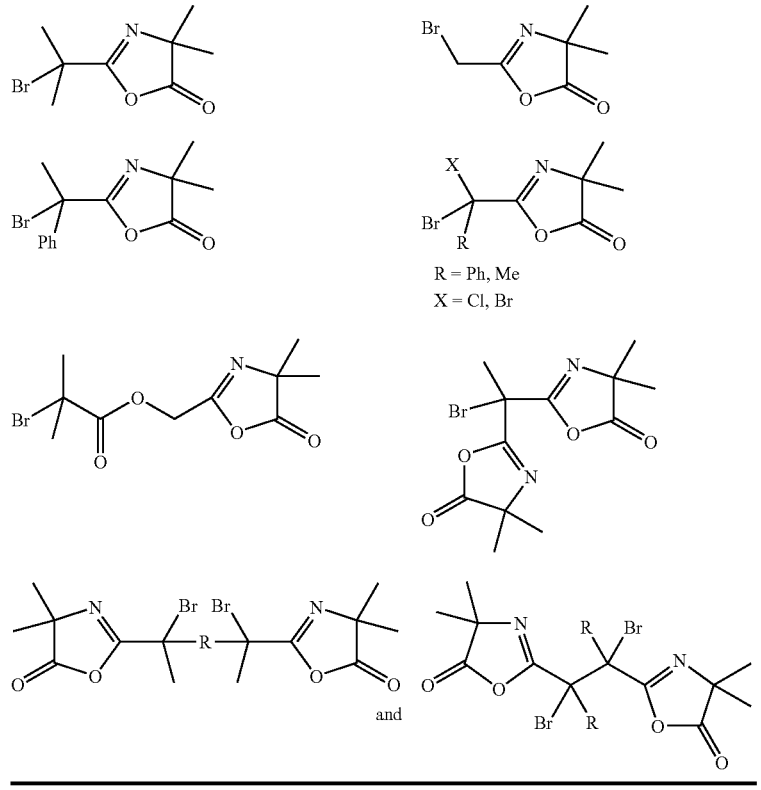

It will be understood that the above-depicted compounds may be modified as described in Formula I. For example, the bromine atom may be substituted for a chlorine, fluorine or pseudohalogen group.

Ring-opened azlactone compounds of Formula II may be made by nucleophilic addition of a compound of the formula $R^5(ZH)_m$ to the azlactone carbonyl of Formula I as shown below. In the Scheme below, $R^5$ is an inorganic or organic group having one or a plurality of nucleophilic —ZH groups, which are capable of reacting with the azlactone moiety of Formula I. $R^5(ZH)_m$ may be water.

If organic, $R^5$ may be a polymeric or non-polymeric organic group that has a valence of m and is the residue of a nucleophilic group-substituted compound, $R^5(ZH)_m$, in which Z is —O—, —S—, or —$NR^6$ wherein $R^6$ can be a H, an alkyl, a cycloalkyl or aryl, a heterocyclic group, an arenyl and m is at least one, preferably at least 2. The organic moiety $R^5$ has a molecular weight up to 20,000, preferably selected from mono- and polyvalent hydrocarbyl (i.e., aliphatic and aryl compounds having 1 to 30 carbon atoms and optionally zero to four catenary heteroatoms of oxygen, nitrogen or sulfur), polyolefin, polyoxyalkylene, polyester, polyolefin, polyacrylate, or polysiloxane backbones. If inorganic, $R^5$ may comprise silica, alumina or glass having one or a plurality of —ZH groups on the surface.

In one embodiment, $R^5$ comprises a non-polymeric aliphatic, cycloaliphatic, aromatic or alkyl-substituted aromatic moiety having from 1 to 30 carbon atoms. In another embodiment, $R^5$ comprises a polyoxyalkylene, polyester, polyolefin, polyacrylate, or polysiloxane polymer having pendent or terminal reactive —ZH groups. Useful polymers include, for example, hydroxyl, thiol or amino terminated polyethylenes or polypropylenes, hydroxyl, thiol or amino terminated poly(alkylene oxides) and polyacylates having pendant reactive functional groups, such as hydroxyethyl acrylate polymers and copolymers.

Depending on the nature of the functional group(s) of $R^5(ZH)_m$, a catalyst may be added to effect the condensation reaction. Normally, primary amine groups do not require catalysts to achieve an effective rate. Acid catalysts such as trifluoroacetic, ethanesulfonic, and toluenesulfonic acids are effective with hydroxyl groups and secondary amines.

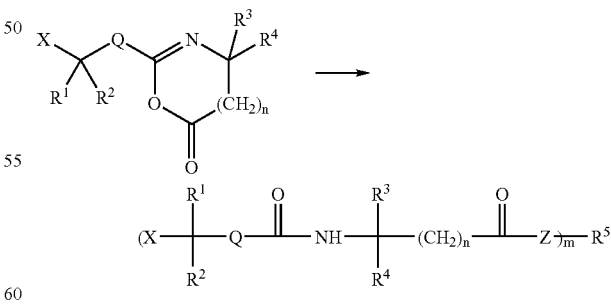

With respect to the compound $R^5(ZH)_m$, m is at least one, but preferably m is at least two. The multiple —ZH groups of the polyfunctional compound may be the same or different. Multifunctional compounds may be reacted with the azlactone compound of Formula I to produce polyfunctional initiators of Formula II, where m is at least two. Such polyfunctional initiators allow the preparation of graft, and star (co)polymers and other useful topologies.

Useful alcohols of the formula $R^5(ZH)_m$ include aliphatic and aromatic monoalcohols and polyols. Useful monoalcohols include methanol, ethanol, octanol, decanol, and phenol. The polyols useful in the present invention include aliphatic or aromatic polyols having 1 to 30 carbon atoms, at least two hydroxyl groups. Example of useful polyols include ethylene glycol, propylene glycol, butanediol, 1,3-pentane diol, 2,2-oxydiethanol hexanediol poly(pentylene-adipate glycol), poly(tetramethylene ether glycol), poly(ethylene glycol), poly(caprolactone diol), poly(1,2-butylene oxide glycol), trimethylyol ethane, trimethylol propane, trimethyol aminomethane, ethylene glycol, 2-butene-1,4-diol, pentaerythritol, dipentaerythritol, and tripentaerythritol. The term "polyol" also includes derivatives of the above-described polyols such as the reaction product of the polyol with di- or poly-isocyanate, or di- or poly-carboxylic acid, the molar ratio of polyol to —NCO, or —COOH being 1 to 1.

Useful amines of the formula $R^5(ZH)_m$ include aliphatic and aromatic monoamines and polyamines. Any primary or secondary amine may be employed, although primary amines are preferred to secondary amines. Useful monoamines include, for example, methyl-ethyl-, propyl-, hexyl-, octyl, dodecyl-, dimethyl-, methyl ethyl-, and aniline. The term "di-, or polyamine," refers to organic compounds containing at least two non-tertiary amine groups. Aliphatic, aromatic, cycloaliphatic, and oligomeric di- and polyamines all are considered useful in the practice of the invention. Representative of the classes of useful di- or polyamines are 4,4'-methylene dianiline, 3,9-bis(3-aminopropyl)-2,4,8,10-tetraoxaspiro[5,5]undecane, and polyoxyethylenediamine. Many di- and polyamines, such as those just named, are available commercially, for example, those available from Huntsman Chemical, Houston, Tex. The most preferred di- or polyamines include aliphatic diamines or aliphatic di- or polyamines and more specifically compounds with two primary amino groups, such as ethylene diamine, hexamethylene diamine, dodecanediamine, and the like.

Useful thiols of the formula $R^5(ZH)_m$ include aliphatic and aromatic monothiols and polythiols Useful alkyl thiols include methyl, ethyl and butyl thiol, as well as 2-mercaptoethanol, 3-mercapto-1,2-propanediol, 4-mercaptobutanol, mercaptoundecanol, 2-mercaptoethylamine, 2,3-dimercaptopropanol, 3-mercaptopropyltrimethoxysilane, 2-chloroethanethiol, 2-amino-3-mercaptopropionic acid, dodecyl mercaptan, thiophenol, 2-mercaptoethyl ether, and pentaerythritol tetrathioglycolate. Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

The invention provides multifunctional initiators of Formula II, whereby an azlactone initiator of Formula I is ring-opened by a multireactive or multifunctional compound of the formula $R^5(ZH)_m$, where m is at least 2. Such multifunctional initiators may be used to produce branched, star and graft (co)polymers and other topologies. It will also be apparent that such (co)polymers may also be prepared by first polymerizing a monomer using the initiator of Formula I, to produce polymers having an azlactone group at one terminal end, and then subsequently reacting the polymers with a polyfunctional compound of the formula $R^5(ZH)_m$, where m is at least 2.

In another embodiment, the multifunctional initiators may comprise a solid support having a plurality of initiator moieties on the surface thereof. Such initiator-functionalized supports have the general structure (corresponding to Formula II):

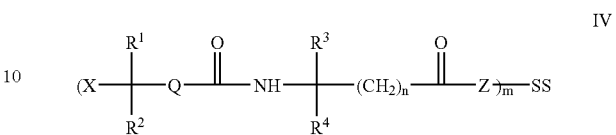

Wherein X, $R^1$, $R^2$, $R^3$, $R^4$, Z, n and m are as previously described for Formula II and SS is a solid support corresponding to $R^5$. The solid support material includes functional groups to which initiator molecules of Formula I can be covalently attached for building large or small organic compounds. Useful functional groups include hydroxyl, amino and thiol functional groups corresponding to —ZH.

The support material can be organic or inorganic. It can be in the form of solids, gels, glasses, etc. It can be in the form of a plurality of particles (e.g., beads, pellets, or microspheres), fibers, a membrane (e.g., sheet or film), a disc, a ring, a tube, or a rod, for example. Preferably, it is in the form of a plurality of particles or a membrane. It can be swellable or non-swellable and porous or nonporous.

The support material can be a polymeric material that can be used in conventional solid phase synthesis. It is chosen such that it is generally insoluble in the solvents or other components used in synthetic reactions that occur during the course of solid phase synthesis.

Examples of useable pre-existing support materials are described in G. B. Fields et al., *Int. J. Peptide Protein Res.*, 35, 161 (1990) and G. B. Fields et al., in *Synthetic Peptides: A User's Guide*, G. A. Grant, Ed., pages 77-183, W. H. Freeman and Co., New York, N.Y. (1992). The support material is in the form of an organic polymeric material, such as polystyrenes, polyalkylenes, nylons, polysulfones, polyacrylates, polycarbonates, polyesters, polyimides, polyurethanes, etc. and having hydroxyl, amino or thiol substituents on the surface. For pre-existing support materials, a preferred support material is polystyrene.

In the present polymerization, the amounts and relative proportions of initiator, transition metal compound and ligand are those effective to conduct atom transfer radical polymerization (ATRP). Initiator efficiencies with the present initiator system (initiator/transition metal compound/ligand system) are generally very good (at least 50%, preferably greater than 80%, more preferably greater than 90%). Accordingly, the amount of initiator can be selected such that the initiator concentration is from $10^{-4}$ M to 1M, preferably $10^{-3}$ to $10^{-1}$ M. Alternatively, the initiator can be present in a molar ratio of from $10^{-4}$:1 to $10^{-1}$:1, preferably from $10^{-3}$:1 to $5 \times 10^{-2}$:1, relative to monomer. The initiator system will generate, during polymerization, the redox conjugate of the transition metal compound in an amount sufficient to reversibly deactivate some portion of radicals formed in a reaction between said initiator, said transition metal compound and a radically polymerizable monomer.

The molar proportion of transition metal compound relative to initiator is generally that which is effective to polymerize the selected monomer(s), but may be from 0.001:1 to 10:1, preferably from 0.1:1 to 5:1, more preferably from 0.3:1 to 2:1, and most preferably from 0.9:1 to 1.1:1. Conducting the polymerization in a homogeneous system may permit reducing the concentration of transition metal and ligand such that the molar proportion of transition metal compound to initiator is as low as 0.0001:1.

Similarly, the molar proportion of ligand relative to transition metal compound is generally that which is effective to polymerize the selected monomer(s), but can depend upon the number of coordination sites on the transition metal compound that the selected ligand will occupy. The amount of ligand may be selected such that the ratio of coordination sites on the transition metal compound to coordination sites which the ligand will occupy is from 0.1:1 to 100:1, preferably from 0.2:1 to 10:1, more preferably from 0.5:1 to 3:1, and most preferably from 0.5:1 to 2:1. It is possible for a solvent or for a monomer to act as a ligand.

The present polymerization may be conducted in bulk, or in a solvent. Solvents, preferably organic, can be used to assist in the dissolution of the initiator and initiator system in the polymerizable monomers, and as a processing aid. Preferably, such solvents are not reactive with the azlactone group. It may be advantageous to prepare a concentrated solution of the transition metal complex in a small amount of solvent to simplify the preparation of the polymerizable composition. Suitable solvents include ethers such as diethyl ether, ethyl propyl ether, dipropyl ether, methyl t-butyl ether, di-t-butyl ether, glyme (dimethoxyethane), diglyme, diethylene glycol dimethyl ether; cyclic ethers such as tetrahydrofuran and dioxane; alkanes; cycloalkanes; aromatic hydrocarbon solvents such as benzene, toluene, o-xylene, m-xylene, p-xylene; halogenated hydrocarbon solvents; acetonitrile; lactones such as butyrolactone, and valerolactones; ketones such as acetone, methyl ethyl ketone, methyl isobutyl ketone, cyclopentanone, and cyclohexanone; sulfones such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl) ethanol, and 2,2'-sulfonyldiethanol; sulfoxides such as dimethyl sulfoxide; cyclic carbonates such as propylene carbonate, ethylene carbonate and vinylene carbonate; carboxylic acid esters such as ethyl acetate, Methyl Cellosolve™ and methyl formate; and other solvents such as methylene chloride, nitromethane, acetonitrile, glycol sulfite and 1,2-dimethoxyethane (glyme), mixtures of such solvents, and supercritical solvents (such as $CO_2$). The present polymerization may also be conducted in accordance with known suspension, emulsion and precipitation polymerization processes.

The polymerization reaction may be controlled by matching the reactivity of the groups in the initiator with the monomer, and by matching the energetics of bond breaking and bond forming in dormant species, e.g., dormant polymer chains and transition metal species. Matching the reactivities of the initiator with the monomer depends to some degree on the radical stabilizing effects of the substituents. Thus, where the monomer is a halogenated alkene, one may select an initiator where of $R^1$ and/or $R^2$ are lower alkyl groups. On the other hand, if one wishes to polymerize an arene- or ester-stabilized monomer (e.g., a (meth)acrylate, acrylonitrile or styrene), one may select an initiator which is stabilized by a similar group, wherein one of $R^1$ and/or $R^2$ is aryl, or arenyl. Such matching of substituents on the initiator and monomer provides a beneficial balance of the relative reactivities of the initiator and monomer.

Preferably, the monomer, initiator, transition metal compound and ligand are selected such that the rate of initiation is not less than 1,000 times (preferably not less than 100 times) slower than the rate of propagation and/or transfer of the X group to the polymer radical. In the present application, "propagation" refers to the reaction of a polymer radical with a monomer to form a polymer-monomer adduct radicals.

Polymerizing may be conducted at a temperature of from −78 to 200° C., preferably from 0 to 160° C. and most preferably from 20 to 140° C. The reaction should be conducted for a length of time sufficient to convert at least 10% (preferably at least 50%, more preferably at least 75% and most preferably at least 90%) of the monomer to polymer. Typically, the reaction time will be from several minutes to 5 days, preferably from 30 minutes to 3 days, and most preferably from 1 to 24 hours.

Polymerizing may be conducted at a pressure of from 0.1 to 100 atmospheres, preferably from 1 to 50 atmospheres and most preferably at ambient pressure (although the pressure may not be measurable directly if conducted in a sealed vessel). An inert gas such as nitrogen or argon may be used.

If desired, the polymerization process may further comprise the steps of isolating the resulting polymer from the solvent, monomer, and initiators system, and may further comprise the step of recovering and recycling the initiator and transition metal complex of the initiator system. The transition metal may be isolated by many techniques known in the art including addition of a solvent in which the transition metal complex is insoluble, addition of a ligand that reduces the solubility of the transition metal complex in a chosen solvent, filtration with silica, alumina or Celite, and centrifugation. In many instances, it is preferred to further functionalize the azlactone terminal group prior to separation of the transition metal complex as many separation techniques, such as contact with silica, can result in ring-opening of the azlactone group. Thus it is preferred to first react the product (co)polymer with a compound of the formula $R^5(ZH)_m$ to functionalize the terminal azlactone group prior to isolation of the transition metal complex, as previously described.

The (co)polymers obtained by the method of the invention may be described as telechelic (co)polymers comprising polymerized units of one or more free radically (co)polymerizable monomers (as previously described), a first azlactone terminal group derived from the initiator of Formula I and a second terminal group selected from the group derived from X. Alternatively, when using the initiators of Formula II, the first terminal group "Az" will comprise the ring-opened residue of the azlactone group of the Formula III:

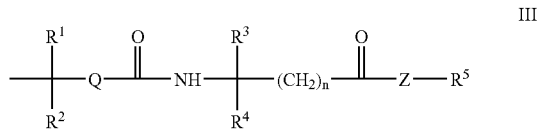

where $R^1$, $R^2$, $R^3$, $R^4$, $R^5$, Z, Q and n are as previously defined.

Such (co)polymers have the general formula Az—$(M^1)_x$ $(M^2)_x(M^3)_x$ . . . $(M^\Omega)_x$—X, wherein X is Cl, Br or a pseudohalogen group, $M^1$ to $M^\Omega$ are each polymerized monomer units derived from a radically (co)polymerizable monomer unit having an average degree of polymerization x, each x is independent, and Az is an azlactone group or a ring-opened azlactone group of Formula III. Further, the polymer product retains the functional group "X" at one terminal end of the polymer necessary to initiate a further polymerization (or functionalization). The polymer product further comprises either the azlactone moiety or the ring-opened azlactone moiety of the initiator at the other terminal end, which may be further reacted or functionalized as desired. Because the two terminal moieties have different functionality and reactivity, each terminus may be independently functionalized.

The terminal "X" group may be functionalized independently from the terminal "Az" group. For example, where X is Br, the terminal bromine may be reduced to a hydrogen by treatment with $Bu_3SnH$, may be converted to an acyl group by treatment with a trimethylsilyl vinyl ether, and may be converted to an azide by treatment with $NaN_3$, which in turn may be converted to an amine by reduction with $LiAlH_4$. Other methods of converting a terminal halide group to other functional groups are known in the art, and reference may be made to Chem. Rev., vol. 101, pp. 2921-2990, 2001.

The present invention encompasses a novel process for preparing random, block, multi-block, star, gradient, random hyperbranched and dendritic copolymers, as well as graft or "comb" copolymers. Each of these different types of copolymers will be described hereunder.

Since ATRP is a "living" or "controlled" polymerization, it can be initiated and terminated as desired. Thus, in one embodiment, once the first monomer is consumed in the initial polymerizing step, a second monomer can then be added to form a second block on the growing polymer chain in a second polymerizing step. Additional polymerizations with the same or different monomer(s) can be performed to prepare multi-block copolymers. The subsequent polymer steps may use the same initiator system as in the first step of the polymerization, or another may be chosen to reflect or "match" the different reactivity of the subsequent monomers.

Because ATRP is radical polymerization, blocks can be prepared in essentially any order. One is not necessarily limited to preparing block copolymers where the sequential polymerizing steps must flow from the least stabilized polymer intermediate to the most stabilized polymer intermediate, such as is necessary in ionic polymerization. Thus, one can prepare a multi-block copolymer in which a polyacrylonitrile or a poly(meth)acrylate block is prepared first, then a styrene or butadiene block is attached thereto, etc.

Furthermore, a linking group is not necessary to join the different blocks of the present block copolymer. One can simply add successive monomers to form successive blocks. Further, it is also possible (and in some cases advantageous) to first isolate a (co)polymer produced by the present ATRP process, then react the polymer with an additional monomer using a different initiator/catalyst system (to "match" the reactivity of the growing polymer chain with the new monomer). In such a case, the product polymer having a terminal "X" group acts as the new initiator for the further polymerization of the additional monomer. Since the novel initiators provide a reactive group "Az" at a terminal end of the polymer, linking groups may be used to join two polymer blocks. For example, in one embodiment, a polymer prepared in accord with the present invention, and having an azlactone group at one terminus, may be reacted with a second polymer block having a nucleophilic terminal group.

Statistical copolymers may be produced using the initiators of the present invention. Such copolymers may use 2 or more monomers in a range of about 0-100% by weight of each of the monomers used. The product copolymer will be a function of the molar amounts of the monomers used and the relative reactivity of the monomers.

The present invention also provides graft or "comb" copolymers. Here, a first (co)polymer having pendent nucleophilic functional groups, such hydroxy-, amino- or thio- groups, etc. is provided. An example of a useful (co)polymers include hydroxyethyl acrylate (co)polymers. Next, the reactive functional groups of the first (co)polymer is reacted with the azlactone initiators of Formula I to provide a (co)polymer having pendent, ring-opened initiator moieties, the reaction product having the structure of Formula II, where $R^5$ is the residue of the first (co)polymer. This product (co)polymer may then be used as an initiator to polymerize the previously-described monomers to produce a comb (co)polymer. Alternatively, the first (co)polymer may be reacted with a telechelic (co)polymer of the invention, whereby the reactive "Az" terminal group reacts with the pendent reactive group of the first (co)polymer.

Gradient or tapered copolymers can be produced using ATRP by controlling the proportion of two or more monomers being added. For example, one can prepare a first block or an oligomer of a first monomer, then a mixture of the first monomer and a second distinct monomer can be added in proportions of from, for example, 1:1 to 9:1 of first monomer to second monomer. After conversion of all monomer(s) is complete, sequential additions of first monomer-second monomers mixtures can provide subsequent "blocks" in which the proportions of first monomer to second monomer vary. Thus, the invention provides copolymers obtained from two or more radically (co)polymerizable monomers wherein the copolymer has a composition that varies along the length of the polymer chain from azlactone terminus to opposite terminus based on the relative reactivity ratios of the monomers and instantaneous concentrations of the monomers during polymerization

EXAMPLES

All reagents unless otherwise noted were purchased from Aldrich (Milwaukee, Wis.) and were used in their delivered condition. Polymerizable reagents were stripped of inhibitors prior to use by passing them through an alumina column (also supplied by Aldrich). Solvents were purchased from EM Science located in Gibbstown, N.J.

Glossary
"bpy" means bipyridyl;
"MMA" means methyl methacrylate;
"PMMA" means poly(methyl methacrylate);
"P" means polydispersity index;
"bromo-di-methyl azlactone" means 2-(1-bromo-1-methyl ethyl)-4,4-dimethyl-4H-oxazol-5-one;
"3× initiator" means 2-(1-bromo-1-methyl ethyl)-2-methyl-propionic acid 2,2-bis-[2-(1-bromo-1-methyl ethyl)-2-methylpropionyloxymethyl]-butyl ester;
"DBU" means 1,8-diazabicyclo[5.4.0]undec-7-ene; and
"GPC" means gel permeation chromatography.

Example 1

Preparation of
2-(2-bromopropionylamino)-2-methylpropionic Acid

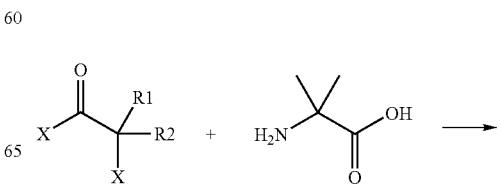

-continued

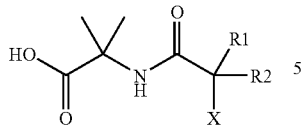

X = Br, R¹ = H, R² = CH₃

To a stirring mixture of 2-aminoisobutyric acid (52.08 g, 0.51 mol), sodium hydroxide (20.20 g, 0.51 mol), 200 mL water, and 50 mL chloroform cooled to −12° C., was added a solution of 2-bromopropionyl bromide (100 g, 0.46 mol) in 150 mL chloroform over 15 minutes. The temperature was maintained between −15 and −12° C. during the addition. The reaction mixture was then allowed to warm to room temperature and the precipitated solid was filtered. The solid was mixed with 700 mL hot toluene, and then cooled. The white solid was then filtered and dried under vacuum. A yield of 77.60 g (70%) was obtained.

Example 2

Preparation of 2-(1-bromoethyl)-4,4-dimethyl-4H-oxazol-5-one

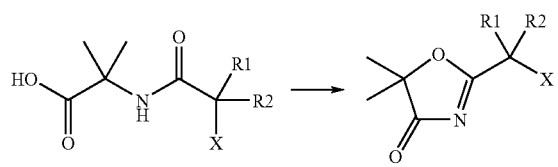

X = Br, R¹ = H, R² = CH₃

To a stirring mixture of 2-(2-bromopropionylamino)-2-methyl propionic acid (50.00 g, 0.21 mol), triethylamine (23.37 g, 0.23 mol), and 150 mL acetone cooled to 5° C., was added dropwise a solution of ethyl chloroformate (25.07 g, 0.23 mol) in 40 mL acetone. After full addition, the mixture was allowed to warm to room temperature, and was stirred for two hours. The mixture was filtered, and the solid was washed with ether. The solvent was then removed under vacuum, and the residue was filtered. The filtrate was distilled under reduced pressure to give a colorless oil (bp 63-64° C. at 1 mmHg). A yield of 34.73 g (75%) was obtained.

Example 3

Preparation of 2-(2-chloro acetylamino)-2-methyl propionic Acid

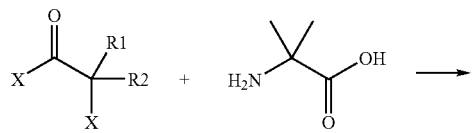

-continued

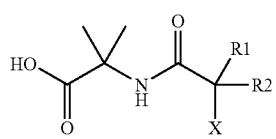

X = Cl, R¹ = R² = H

To a stirring mixture of 2-aminoisobutyric acid (165.8 g, 1.61 mol), sodium hydroxide (64.4 g, 1.61 mol), and 800 mL water cooled to 5° C., was added two separate solutions of chloroacetyl chloride (200 g, 1.77 mol) and sodium hydroxide (70.8 g, 1.77 mol) in 143 mL water. The temperature was maintained between 5 to 10° C. during the addition. The reaction mixture was then allowed to warm to room temperature and the solution was acidified with 165 mL of concentrated aq. HCl. The precipitated solid was filtered and dried under vacuum. A yield of 180.4 g (62%) was obtained.

Example 4

Preparation of 2-(chloromethyl)-4,4-dimethyl-4H-oxazol-5-one

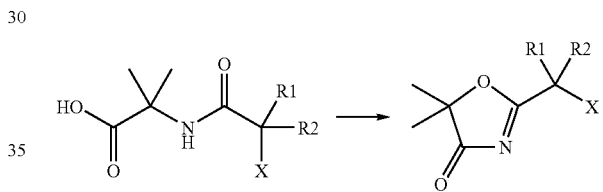

X = Cl, R¹ = R² = H

To stirring mixture of 2-(2-chloro acetylamino)-2-methyl propionic acid (18.04 g, 0.10 mol), triethylamine (11.13 g, 0.11 mol), and 100 mL of acetone cooled with an ice bath was added ethyl chloroformate (10.52 mL, 0.11 mol) over 10 minutes. The reaction mixture was warmed to room temperature and stirred for 2 hours. The mixture was then filtered, and the filtrate was concentrated under vacuum. Hexane (200 mL) was added to the residue and the mixture was filtered. After removal of the solvent under vacuum, the residue was distilled under reduced pressure (bp 59-60° C. at 7 mmHg) to give a colorless oil. A yield of 13.18 g (82%) was obtained.

Example 5

Preparation of 2-(2-bromo-2-methyl propionylamino)-2-methyl-propionic Acid

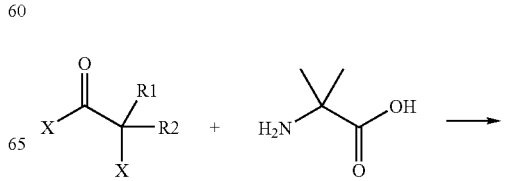

-continued

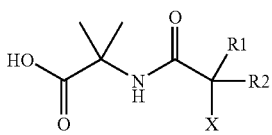

X = Br, R¹ = CH₃, R² = CH₃

A stirring mixture of 2-aminoisobutyric acid (28.5 g, 0.28 mol), sodium hydroxide (11.1 g, 0.28 mol), 115 mL of water, and 30 mL of chloroform was cooled to −10° C. and stirred vigorously while a solution of 2-bromisobutyryl bromide (57.0 g, 0.25 mol) in 85 mL of chloroform was added dropwise. When addition was complete, the reaction flask was removed from the cold bath and allowed to warm to room temperature. The mixture stirred for 15 hours. Concentrated HCl (10 mL) was then added to the mixture and stirring was continued for another 30 minutes. A white solid (32.0 g) was filtered off, and the aqueous and organic phases of the filtrate were separated. The organic phase was dried over magnesium sulfate, filtered, and evaporated at reduce pressure to leave a white solid (21.0 g). The two solid portions were combined and recrystallized from toluene to afford 27.1 g (43%) of the title compound as a white solid with IR and NMR spectra consistent with the desired product.

Example 6

Preparation of 2-(1-bromo-1-methyl ethyl)-4,4-dimethyl-4H-oxazol-5-one

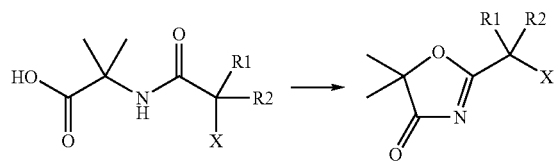

X = Br, R¹ = CH₃, R² = CH₃

A solution of ethyl chloroformate (32.4 g, 0.30 mol) in 50 mL acetone was added dropwise to a stirring mixture of 2-(2-bromo-2-methyl propionylamino)-2-methylpropionic acid (67.9 g, 0.27 mol) and triethylamine (30.0 g, 0.30 mol) in 200 mL of acetone at −15° C. When addition was complete, the mixture was stirred at room temperature for 2 hours, and the white solid was filtered off and washed with 100 mL of ether. The combined filtrates were reduced in volume to about 200 mL at reduced pressure and cooled in a refrigerator at about 5° C. overnight. The small amount of white solid that had separated was removed by filtration, and the solvents were evaporated at reduced pressure. The residue was taken up in 300 mL of ether, filtered, and the solvent evaporated to leave the title compound (61.5 g, 98%) with IR and NMR spectra consistent with the desired product.

Example 7

Preparation of 2-(2-bromo-2-methyl propionylamino)-2-methyl propionic acid 2,2-bis-[2-(2-bromo-2-methyl propionylamino)-2-methyl propionyloxymethyl]-butyl ester

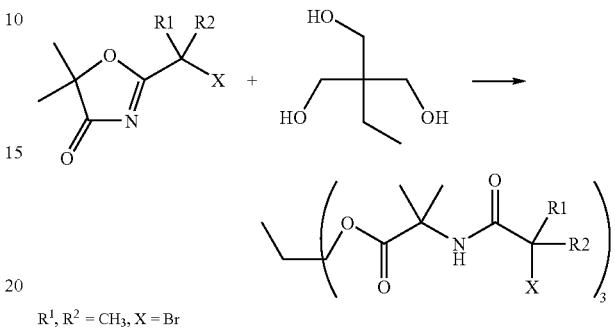

R¹, R² = CH₃, X = Br

A mixture of 2-(1-bromo-1-methyl ethyl)-4,4-dimethyl-4H-oxazol-5-one (17.3 g, 74 mmol), trimethylolpropane (3.30 g, 24.6 mmol), and trifluoroacetic acid (0.10 g, 0.9 mmol) was heated in a sealed vessel at 75° C. for 17 hours. The resulting product, a white solid, was recrystallized twice from aqueous ethanol to afford the title compound (12.7 g, 62%) as a white solid with IR and NMR spectra consistent with the desired product.

Example 8

Controlled Polymerization of Methyl Methacrylate

In a 50 mL three-necked reaction vessel equipped with manual stirring, N₂ inlets and outlets, and a thermocouple, MMA (21.025 g, 210 mmol), bromo-di-methyl azlactone (0.94 g, 4 mmol), and bpy (1.88 g., 12 mmol) were stirred and purged with N₂ for a period of 30 minutes. The solution was also heated to 70° C. via an oil bath powered by a J-Kem digital temperature controller. CuCl (0.392 g., 4 mmol), stored and weighed in an inert atmosphere, was added such that the molar ratios of the reagents used were monomer:initiator:CuCl:ligand=105:2:2:6. The theoretical $M_n$ of the final polymer at 100% conversion using this ratio was about 5,300 g/mol. The reaction was allowed to proceed for 70 minutes.

A syringe was used to take aliquots of the mixture through a rubber septa as time passed. The aliquots were immediately quenched in a large excess of methanol. The precipitate was then filtered, dried and submitted for GPC.

The results of the polymerization of MMA are shown in Table 8.1 and are plotted in Figure 8.1.

TABLE 8.1

GPC data for ATRP of MMA using bromo dimethyl azlactone.

| Time (min.) | $M_w$ $(10^{-3})$ | $M_n$ $(10^{-3})$ | P |
|---|---|---|---|
| 10 | 1.87 | 1.73 | 1.08 |
| 20 | 2.86 | 2.45 | 1.17 |
| 30 | 2.97 | 2.38 | 1.25 |
| 40 | 3.29 | 2.57 | 1.28 |
| 50 | 3.51 | 2.71 | 1.29 |

TABLE 8.1-continued

GPC data for ATRP of MMA using bromo dimethyl azlactone.

| Time (min.) | $M_w$ ($10^{-3}$) | $M_n$ ($10^{-3}$) | P |
|---|---|---|---|
| 60 | 3.95 | 3.05 | 1.29 |
| 70 | 5.10 | 3.90 | 1.31 |

The data in Table 1 demonstrates that the molecular weight increases steadily over time and that the polydispersity is <1.1 at lower conversions and increases to 1.3 at higher conversions. These characteristics are indicative of a living/controlled polymerization process.

Example 9

Use of a Multi-Functional Initiator to Synthesize Poly(Methyl Methacrylate) PMMA Star Polymers A 100 mL three-necked reaction vessel, equipped with manual stirring, $N_2$ inlets and outlets, and a thermocouple, and was charged with MMA, 21.025 g, 210 mmol), 3× initiator (1.115 g, 4 mmol), toluene (46 g, 33 wt. % solids) and bpy (1.88 g, 12 mmol). The solution were stirred and purged with $N_2$ for a period of 30 minutes, then heated to 50° C. via an oil bath powered by a J-Kem digital temperature controller. CuCl (0.392 g, 4 mmol), stored and weighed in an inert atmosphere, was added such that the molar ratios of the reagents used were monomer:initiator:CuCl:ligand=105:2:2:6. The theoretical $M_n$ of the final polymer at 100% conversion using this ratio was about 16,000 g/mol or about 5,300 g/mol per arm. The reaction was allowed to proceed for 6 hours.

The $M_n$, as determined by GPC, of the resulting poly (MMA) star polymer was 16,400, which compared favorably to the theoretical value. Furthermore, the star polymer had a polydispersity, P, of 1.24.

Example 10

Using a Functional Initiator to Yield Star Polymers Through Chemical Modification Linear PMMA arms were synthesized according to the methods taught in Example 8 and GPC was used to confirm the $M_n$ of the polymer to be 10,300 g/mol (P=1.18). In a 9-dram glass vial, tris-aminoethyl amine (0.0142 g, 9.7×$10^{-5}$ mol) was added to a 33 wt. % toluene solution containing 3.00 g. (2.91×$10^{-4}$ mol) of functional PMMA arms. The vial was capped and placed in a heated shaker bath at 60° C. for 16 hours. The resulting star polymer had a $M_n$ of 34,900 g/mol and P=1.10 as determined by GPC.

Example 11

Using a Functional Initiator to Yield Star Polymers Through Chemical Modification Linear PMMA arms were synthesized according to the methods taught in Example 8 and GPC was used to confirm the $M_n$ of the polymer to be 10,300 g/mol (P=1.18).

In a 9-dram glass vial, tris-aminoethyl amine (0.0142 g, 9.7×$10^{-5}$ mol) was added to a 33 wt. % toluene solution containing functional PMMA (3.00 g, 2.91×$10^{-4}$ mol) arms. A catalytic amount of DBU was added to aid in reaction completion. The vial was capped and placed in a heated shaker bath at 60° C. for 16 hours. The resulting star polymer had a $M_n$ of 30,500 g/mol and P=1.11 as determined by GPC.

Example 12

Using a Functional Initiator to Synthesize Block Copolymers

A three-armed PMMA macro-initiator was synthesized according to the methods taught in Example 9. The macro-initiator possessed a Mw of 37,000 g/mol and a $M_n$ of 18,800 g/mol. In a 100 mL three-necked reaction vessel equipped with manual stirring, $N_2$ inlets and outlets, and a thermocouple, three-armed PMMA macro-initiator (9.69 g, 0.515 mmol), n-butyl acrylate (10.92 g, 0.085 mol), toluene (40 g, 33 wt. % solids) and bpy (0.724 g, 4.6 mmol) were stirred and purged with $N_2$ for a period of 30 minutes. The solution was heated to 70° C. by an oil bath powered by a J-Kem digital temperature controller. CuCl (0.1529 g, 1.5 mmol), stored and weighed in an inert atmosphere, was added such that the molar ratios of the reagents used were monomer:initiator:CuCl:ligand=120:1:3:9. The reaction was allowed to proceed for 8 hours. After moderate conversion, the block copolymer was determined by GPC to possess a Mw of 50,700 g/mol and a $M_n$ of 26,300 g/mol.

Example 13

Controlled Polymerization in Real-Time by IR Spectroscopy

A ReactIR 1000 (ASI Applied Systems, Millersville, Md.) infra-red spectrometer, was fitted with a silicon ATR probe to provide IR spectra in real time and in-situ. The data was processed to give the kinetic parameters of the system. The procedure is similar to a conventional lab scale polymerization with the exception of the incorporation of an IR probe into the solution. The IR spectrometer scanned the solution at set intervals and stored the spectra to obtain quantitative data related to the appearance and disappearance of various species. Also, the spectra show the azlactone had not been ring-opened and remained reactive. In particular, the intensity of the carbon-carbon double bond stretching vibration in acrylate-related monomers is directly proportional to the concentration of the monomer in solution. Thus recording the intensity vs. time can provide kinetic information on a vinyl polymerization.

In a 250 mL three-necked reaction vessel equipped with manual stirring, $N_2$ inlets and outlets, and a thermocouple, and an IR probe, methylmethacrylate (26.4 g), (2-bromo-di-methyl azlactone (1.153 g), toluene (26.4 g) and bpy (2.1 g) were stirred and purged with $N_2$ for a period of 30 minutes. The solution was also heated to 70° C. via an oil bath powered by a J-Kem digital temperature controller. An initial IR scan was taken as a start point of the reaction. CuCl (0.4953 g), stored and weighed in an inert atmosphere, was added immediately after the spectrum was completed.

The intensity of the vinyl peak at 1640 $cm^{-1}$ was monitored at intervals of 30 seconds to 5 minutes over a total reaction time of 8 hours. A plot of $ln(M_0/M)$ vs. time (where $M_0$ is the initial concentration of monomer and M is the concentration at time t) for data out to 340 minutes yielded a straight line with $R^2$=0.9998. Beyond this point, the reaction is >95% complete. This indicates that the polymerization is first order in monomer.

We claim:

1. A controlled radical polymerization initiator system comprising:
   a) an initiator of the formula:

$$(X - \underset{R^2}{\overset{R^1}{C}} - Q - \overset{O}{\underset{}{C}} - NH - \underset{R^4}{\overset{R^3}{C}} - (CH_2)_n - \overset{O}{\underset{}{C}} - Z \frac{\ }{m} R^5$$

wherein X is Cl, Br, or a pseudohalogen group;
$R^1$ and $R^2$ are each independently selected from X, H, an alkyl group, a cycloalkyl group, a heterocyclic group, an arenyl group and an aryl group, or $R^1$ and $R^2$ taken together with the carbon to which they are attached form a carbocyclic ring;
$R^3$ and $R^4$ are each independently selected from an alkyl group, a cycloalkyl group, an aryl group, an arenyl group, or $R^3$ and $R^4$ taken together with the carbon to which they are attached form a carbocyclic ring;
Q is a linking group selected from a covalent bond, $(-CH_2-)_o$, $-CO-O-(CH_2)_o-$, $-CO-O-$
$R^5$ is an organic moiety and has a valency of m, or an organic or inorganic solid support; $(CH_2CH_2O)_o-$, $-CO-NR^6-(CH_2)_o-$, $-CO-S-(CH_2)_o-$, where o is 1 to 12, and $R^6$ is H, an alkly group,
a cycloalkyl group, an arenyl group, a heterocyclic group or an aryl group;
Z is O, NH, S or $NR^6$, wherein $R^6$ is a $C_1$ to $C_6$ alkyl group; and
m is an integer of 1 to 8, and
   b) a transition metal compound that participates in a reversible redox cycle.

2. The initiator of claim 1 wherein at least one of $R_1$ and $R_2$ is a $C_1$ to $C_4$ alkyl group.

3. The initiator of claim 2 wherein $R^1$ and $R^2$ are methyl.

4. The initiator of claim 1 wherein at least one of $R_3$ and $R_4$ is a $C_1$ to $C_4$ alkyl group.

5. The initiator of claim 4 wherein $R_3$ and $R_4$ are methyl.

6. The initiator system of claim 1 wherein said transition metal compound is of the formula $[ML_p]^{n+}A^-$, wherein M is a transition metal in a low valence state,
L is a ligand,
A is an anion,
n is a whole number of 1 to 7, and
p is an integer of 1 to 9.

7. The initiator system of claim 6 wherein said transition metal in a low valence state is selected from the group consisting of Cu(I), Fe(II), Ru(II) and Ni(II).

8. The initiator system of claim 6 wherein A is selected from the group consisting of halogen, alkoxy, $NO_3^{2-}$, $SO_4^{2-}$, $PO_4^{3-}$, $HPO_4^{2-}$, $PF_6^-$, triflate, hexafluorophosphate, methanesulfonate, arylsulfonate, $CN^-$ and alkyl carboxylates and aryl carboxylates.

9. The initiator system of claim 6 wherein M is $Cu^I$ and A is selected from $Cl^-$ and $Br^-$.

10. The initiator system of claim 6 wherein said ligand is selected from the group consisting of:
   i. An Al—, B—, N—, O—, P— or S— containing ligand that coordinates in a σ-bond to said transition metal,
   ii. a carbon-containing ligand that coordinates in a π-bond to said transition metal, and
   iii. a carbon-containing ligand that coordinates in a carbon-transition metal σ-bond but does not form a carbon-carbon bond with a radically polymerizable monomer.

11. The initiator system of claim 1 further comprising redox conjugate of said transition metal compound in an amount sufficient to deactivate some portion of radicals formed in a reaction between said initiator, said transition metal compound and a radically polymerizable monomer.

12. The initiator system of claim 11 wherein said redox conjugate is Cu(II).

13. A method for addition polymerization of one or more olefinically unsaturated monomers comprising:
addition polymerizing one or more olefinically unsaturated monomers using the initiator system of claim 1.

14. The method according to claim 13, wherein the addition polymerization is conducted at a temperature between 0 to 160° C.

15. The method according to claim 13, wherein the addition polymerization is conducted at a temperature between 20 and 140° C.

16. The method according to claim 13, wherein the olefinically unsaturated monomers are selected from (meth) acrylic acid and esters thereof;
fumaric acid and esters thereof; itaconic acid and esters thereof; maleic anhydride; styrene, α-methyl styrene; vinyl halides; (meth)acrylonitrile; vinylidene halides; butadienes; unsaturated alkylsulphonic acids and esters and halides thereof; and (meth)acrylamides; and mixtures thereof.

17. The method according to claim 13, wherein the polymerization is conducted neat or in a solvent.

18. The method of claim 17 wherein said solvent is selected from ethers, cyclic ethers, alkanes, cycloalkanes, aromatic hydrocarbon solvents, halogenated hydrocarbon solvents, acetonitrile, mixtures of such solvents, and supercritical solvents.

19. The method according to claim 13 further comprising a second polymerizing step using one or more additional olefinically unsaturated monomers.

20. The method of claim 13, wherein the initiator is present in a concentration of from $10^{-4}$ M to 1M.

21. The method of claim 13, wherein the molar ratio of initiator and monomer(s) is from $10^{-4}$:1 to $10^{-1}$:1 of initiator to monomer(s).

22. The method of claim 13, wherein the molar ratio of transition metal compound to initiator of from 0.001:1 to 10:1.

23. The method of claim 13, wherein the molar ratio of ligand to the transition metal compound is from 0.1:1 to 100:1.

* * * * *

UNITED STATES PATENT AND TRADEMARK OFFICE
CERTIFICATE OF CORRECTION

| | | |
|---|---|---|
| PATENT NO. | : 7,294,742 B2 | Page 1 of 1 |
| APPLICATION NO. | : 11/081218 | |
| DATED | : November 13, 2007 | |
| INVENTOR(S) | : Duane D. Fansler | |

It is certified that error appears in the above-identified patent and that said Letters Patent is hereby corrected as shown below:

Column 6,
Line 37, after "and" insert -- organic --.

Column 14,
Line 58, delete "Az–$(M_1)_x$" and insert -- Az–$(M^1)_x$ --, therefor.

Column 23,
Lines 24-25, delete "$R^5$ is an organic moiety and has a valency of m, or an organic or inorganic solid support;" and insert in line 12, under structure -- $R^5$ is an organic moiety and has a valency of m, or an organic or inorganic solid support; --, therefor.

Line 28, in claim 1, delete "alkly" and insert -- alkyl --, therefor.

Signed and Sealed this

Second Day of December, 2008

JON W. DUDAS
*Director of the United States Patent and Trademark Office*